United States Patent
Nakajima et al.

(10) Patent No.: US 9,760,185 B2
(45) Date of Patent: Sep. 12, 2017

(54) POINTING DEVICE AND METHOD FOR MANUFACTURING POINTING DEVICE

(71) Applicant: FUJITSU COMPONENT LIMITED, Tokyo (JP)

(72) Inventors: Takashi Nakajima, Tokyo (JP); Fujio Seki, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 39 days.

(21) Appl. No.: 13/749,250

(22) Filed: Jan. 24, 2013

(65) Prior Publication Data
US 2013/0194181 A1    Aug. 1, 2013

(30) Foreign Application Priority Data

Jan. 31, 2012    (JP) .................................. 2012-019045

(51) Int. Cl.
*G06F 3/038*    (2013.01)
*G06F 3/033*    (2013.01)
(Continued)

(52) U.S. Cl.
CPC ............. *G06F 3/033* (2013.01); *B22D 17/20* (2013.01); *G06F 3/03547* (2013.01);
(Continued)

(58) Field of Classification Search
CPC ...... G06F 3/03547; G06F 3/044; G06F 3/045; G06F 3/0338; G02F 1/13338
(Continued)

(56) References Cited

U.S. PATENT DOCUMENTS 5,668,576 A *    9/1997    Ikura et al. .................... 345/173
7,823,467 B2 *    11/2010    Taya et al. ............... 73/862.625
(Continued)

FOREIGN PATENT DOCUMENTS

| JP | 7-295738 | 11/1995 |
|---|---|---|
| JP | 2003-91360 | 3/2003 |
| JP | 2003-296014 | 10/2003 |

OTHER PUBLICATIONS

Patent Abstracts of Japan, Publication No. 2003-296014, Published Oct. 17, 2003.

(Continued)

*Primary Examiner* — Kent Chang
*Assistant Examiner* — Sujit Shah
(74) *Attorney, Agent, or Firm* — Staas & Halsey LLP (57) ABSTRACT

A pointing device includes: a film that includes a protruding portion which protrudes upward, and a plane portion which extends from the protruding portion; a first conducting layer that is disposed under the film; a second conducting layer that is disposed on a base material and is opposed to the first conducting layer; and a plurality of spacers that are formed on any one of a lower portion of the first conducting layer and an upper portion of the second conducting layer, and are arranged, between the first conducting layer and the second conducting layer, so as to be spaced mutually; wherein an interval between the spacers in an area of the plane portion is formed so as to become narrower than an interval between the spacers in an area of the protruding portion.

5 Claims, 6 Drawing Sheets (51) Int. Cl.
  *B22D 17/20* (2006.01)
  *G06F 3/0488* (2013.01)
  *G06F 3/045* (2006.01)
  *G06F 3/0354* (2013.01)

(52) U.S. Cl.
  CPC ............ *G06F 3/045* (2013.01); *G06F 3/0488* (2013.01); *G06F 2203/04103* (2013.01); *G06F 2203/04809* (2013.01); *Y10T 29/4998* (2015.01)

(58) Field of Classification Search
  USPC .......................................................... 345/173
  See application file for complete search history.

(56) References Cited

U.S. PATENT DOCUMENTS

| | | | | |
|---|---|---|---|---|
| 2003/0071784 | A1* | 4/2003 | Sato | G06F 3/0338 345/156 |
| 2003/0122792 | A1* | 7/2003 | Yamamoto et al. | 345/173 |
| 2006/0102462 | A1* | 5/2006 | Bourdelais et al. | 200/512 |
| 2009/0085892 | A1* | 4/2009 | Ishikura | B60K 35/00 345/174 |
| 2009/0165569 | A1* | 7/2009 | Taya | G01D 5/14 73/862.041 |
| 2010/0165551 | A1* | 7/2010 | Chen et al. | 361/679.01 |
| 2011/0157065 | A1* | 6/2011 | Murata | G06F 3/03547 345/173 |
| 2012/0020080 | A1* | 1/2012 | Sato et al. | 362/235 |

OTHER PUBLICATIONS

Patent Abstracts of Japan, Publication No. 2003-091360, Published Mar. 28, 2003.
Patent Abstracts of Japan, Publication No. 07-295738, Published Nov. 10, 1995.

* cited by examiner

POINTING DEVICE AND METHOD FOR MANUFACTURING POINTING DEVICE

CROSS-REFERENCE TO RELATED APPLICATION

This application is based upon and claims the benefit of priority of the prior Japanese Patent Application No. 2012-019045, filed on Jan. 31, 2012, the entire contents of which are incorporated herein by reference.

FIELD

A certain aspect of the embodiments discussed herein is related to a pointing device and a method for manufacturing a pointing device.

BACKGROUND

With the popularization of portable electronic equipment such as a smart-phone and a portable game player, a touch panel which detects an input position in a display screen is used widely. Unlike a trackball, the touch panel equipped with a planate input screen cannot give a user a three-dimensional operational feeling, for example.

On the contrary, a patent document 1 (see Japanese Laid-Open Patent Application No. 2003-296014) discloses a pointing device that has a dome-shaped input screen and detects an input position based on the change of an electric potential by contact of the electrode patterns of two layers in the input screen, and the electrode patterns are arranged so as to form a gap therebetween. A patent document 2 (see Japanese Laid-Open Patent Application No. 2003-91360) discloses a pointing device that has an input screen of a convex curve and detects an input position based on the change of an electric capacity between the electrodes of two layers provided in the input screen.

SUMMARY

According to an aspect of the present invention, there is provided a pointing device including: a film that includes a protruding portion which protrudes upward, and a plane portion which extends from the protruding portion; a first conducting layer that is disposed under the film; a second conducting layer that is disposed on a base material and is opposed to the first conducting layer; and a plurality of spacers that are formed on any one of a lower portion of the first conducting layer and an upper portion of the second conducting layer, and are arranged, between the first conducting layer and the second conducting layer, so as to be spaced mutually; wherein an interval between the spacers in an area of the plane portion is formed so as to become narrower than an interval between the spacers in an area of the protruding portion.

The objects and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
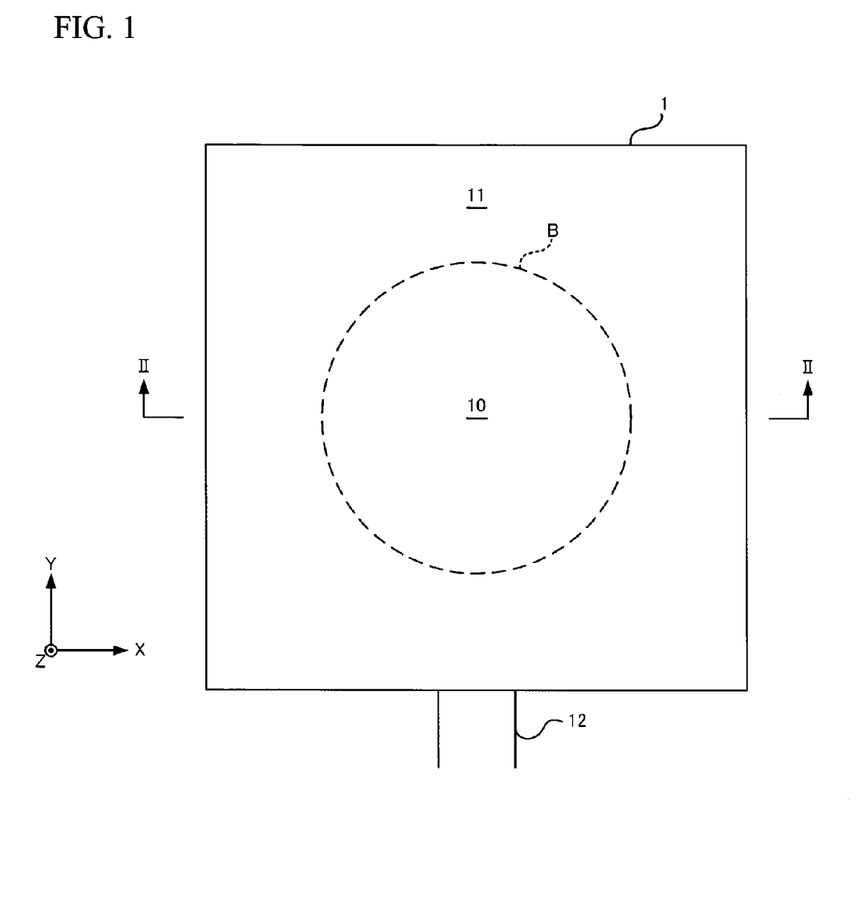
FIG. 1 is a plan view of a pointing device.

FIG. 1 is a plan view of a pointing device. A pointing device 1 is configured as a touch panel which has a three-dimensional form in part, and outputs a position where a user has depressed the pointing device 1 with a finger or a touch pen to another connected device.

The pointing device 1 includes a protruding portion 10 that protrudes upward (i.e., z-direction of FIG. 1), and a plane portion 11 that extends from the protruding portion 10. The protruding portion 10 is an input screen for inputting position information by the depression of a user. The protruding portion 10 is formed in the form of a hemisphere to give the user a feeling of three-dimensional operation. A boundary line B between the protruding portion 10 and the plane portion 11 draws a circle. The form of the protruding portion 10 is not limited to the hemisphere, but may be another three-dimensional form, such as a circular cone.

The plane portion 11 has a rectangle-like outline and is a flat area connected and formed from the circumference of the protruding portion 10. Unlike the protruding portion 10, the plane portion 11 is configured so as not to detect the input position even if the user depresses the plane portion 11. Here, the plane portion 11 is not limited to adjoining the whole circumference of the protruding portion 10 as illustrated in FIG. 1, but may partially adjoin the protruding portion 10. In addition, the form of the outline of the plane portion 11 is not limited to the rectangle.

A flat-shaped cable 12 is provided at an end of the pointing device 1. The cable 12 connects the pointing device to another device.

Figure 2:
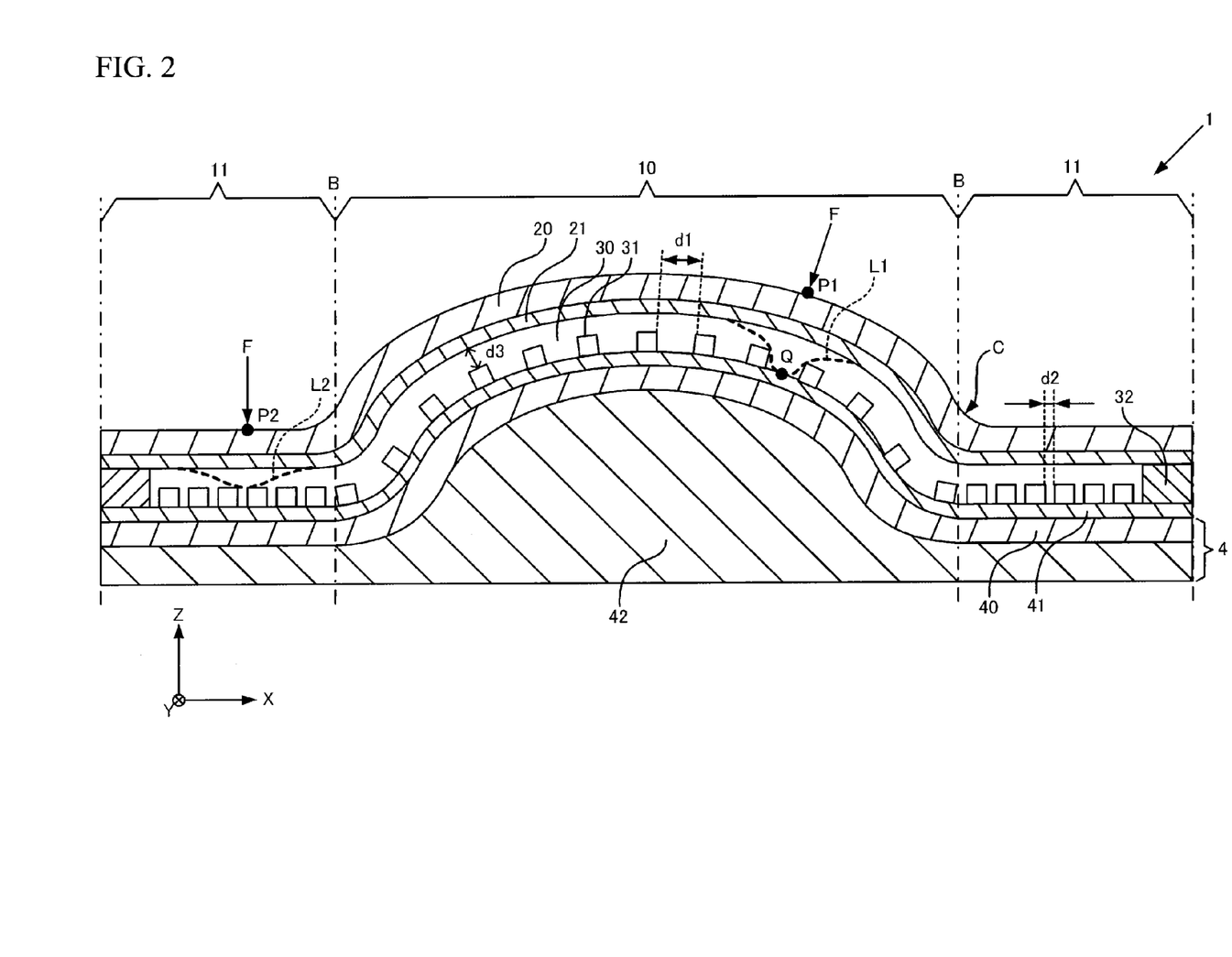
FIG. 2 is a cross sectional view of the pointing device taken along a line II-II in FIG. 1.

FIG. 2 is a cross sectional view of the pointing device 1 taken along a line II-II in FIG. 1. The pointing device 1 includes au upper film 20, an upper conducting layer 21, plural spacers 31, adhesive members 32, a lower conducting layer 41, a lower film 40, and a substrate 42. The upper film 20, the upper conducting layer 21, the lower conducting layer 41, the lower film 40, and the substrate 42 are overlapped with each other, so that the protruding portion 10 and the plane portion 11 as described above are formed.

Each of the upper film 20 and the lower film 40 is made of a material having flexibility, such as Polyethylene Terephthalate (PET), and the thickness thereof is 188 μm, for example. Here, the thickness indicates the length of each film in a Z-direction of FIG. 2, and it is also the same in the following description.

The lower film 40 is supported by bonding to the substrate 42. For example, the substrate 42 is made of plastic or the like. The substrate 42 and the lower film 40 serve as a base material 4 which prevents modification of the film 20 by the depression of the user.

Each of the upper conducting layer 21 and the lower conducting layer 41 is made of a material having conductivity, such as Indium-Tin-Oxide (ITO), for example. The thickness thereof is a few Å to 100 Å, for example. The upper conducting layer 21 and the lower conducting layer 41 are connected to the cable 12. When the upper conducting layer 21 and the lower conducting layer 41 come in contact with each other, a contact position is detected as the input position via the cable 12.

Each of the upper conducting layer 21 and the lower conducting layer 41 is not limited to a conducting layer having permeability, such as Indium-Tin-Oxide (ITO). However, when a display, such as a liquid-crystal-display device, is provided in a lower part of the pointing device 1 in order to show a user an operation image, it is desirable to adopt material having high permeability relatively, such as ITO, as the upper conducting layer 21 and the lower conducting layer 41. In this case, the permeability is required also of the upper film 20, the lower film 40, the spacers 31 and the substrate 42.

The upper conducting layer 21 and the lower conducting layer 41 are laminated under the upper film 20 and on the lower film 40, respectively. The upper conducting layer 21 is opposed to the lower conducting layer 41 across a gap 30. The thickness of the gap 30 is prescribed by the thickness of the adhesive member 32 provided along the circumference of the pointing device 1. The thickness of the adhesive member 32 is 10 to 300 µm, for example. A double-stick tape and adhesives are adopted as the adhesive member 32. However, as long as the adhesive member 32 is a material which adheres to the upper conducting layer 21 and the lower conducting layer 41, the adhesive member 32 may be other means. The gap 30 is filled up with air and may be sealed up so that outside air is intercepted. Alternatively, the gap 30 may be configured so that it may be aerated with the outside by a hole.

The spacers 31 are formed on the lower conducting layer 41. In the protruding portion 10, the spacers 31 are arranged, between the upper conducting layer 21 and the lower conducting layer 41, so as to be spaced mutually by an interval d1. In the plane portion 11, the spacers 31 are arranged, between the upper conducting layer 21 and the lower conducting layer 41, so as to be spaced mutually by an interval d2. The spacers 31 are made of insulating materials, such as an acrylic resin, are formed along a hemispherical form which protrudes in a Z-direction, for example, and are arranged vertically and horizontally in a XY plane. The diameter of each spacer 31 is 30 to 50 µm, for example. The thickness of each spacer 31 is 5 to 10 for example, and is smaller than that of the adhesive member 32. Therefore, in the gap 30, each spacer 31 is away from the upper conducting layer 21, and an interval d3 is formed between each spacer 31 and the upper conducting layer 21. The spacers 31 are not limited to this arrangement, and may come in contact with the upper conducting layer 21 in a state where the spacers 31 do not adhere with the upper conducting layer 21.

The spacers 31 insulate mutually the upper conducting layer 21 and the lower conducting layer 41, in order to prevent an input according to a disturbance factor, such as a wind, that the user does not intend. On the contrary, when the user depresses a point P1 of the protruding portion 10 provided on the flexible upper film 20 (see a code F in FIG. 2), flexure by input load occurs in the interval d1 between the spacers 31 (see a code L1 in FIG. 2). Since the upper conducting layer 21 and the opposed lower conducting layer 41 come in contact with each other, the depressed position P1 is detected as the input position.

Figure 3:
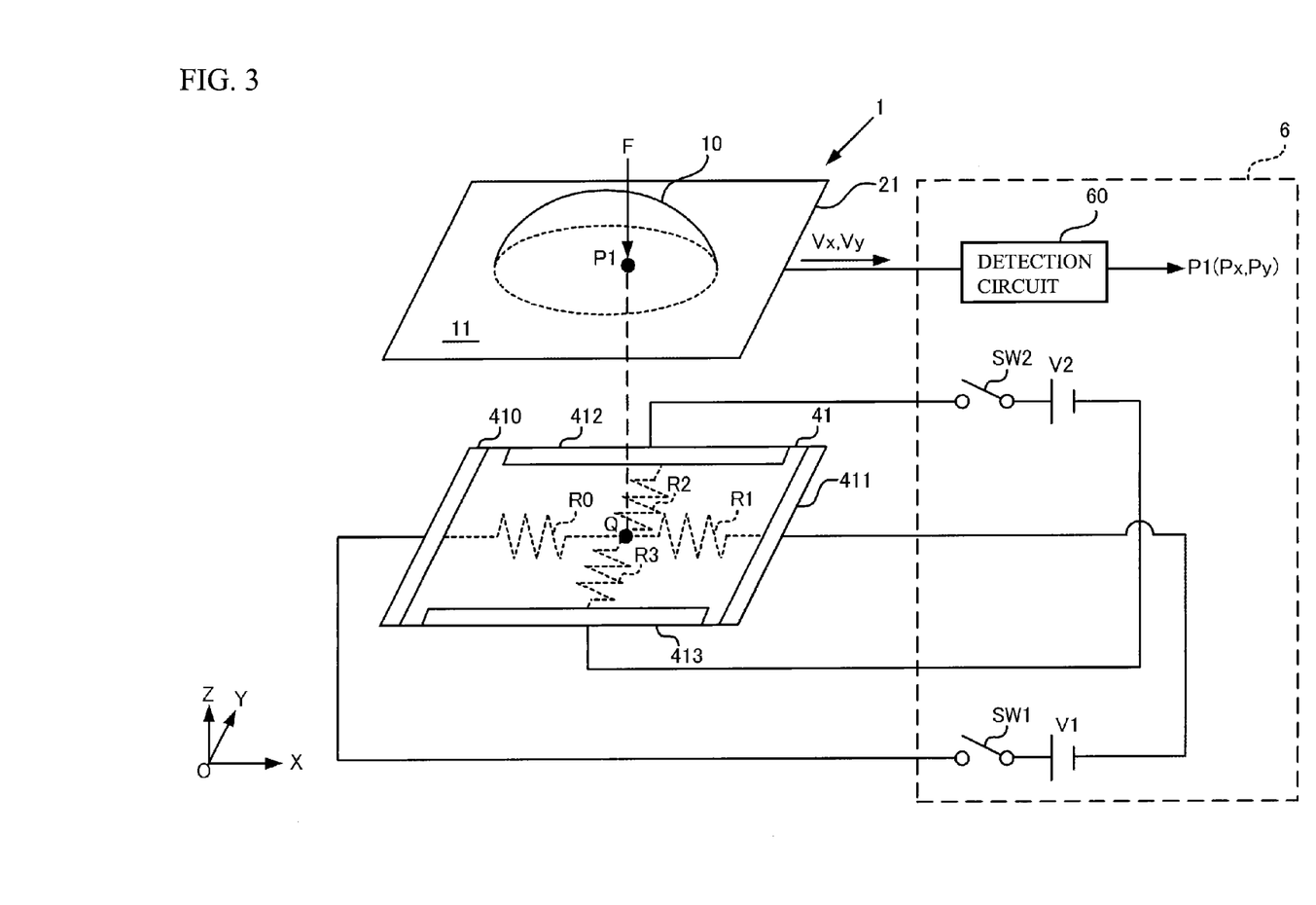
FIG. 3 is an electric block diagram of a detection device which uses the pointing device.

FIG. 3 illustrates an example of a detection method of the input position. The pointing device 1 is connected to an external detection device 6 via the cable 12. The detection device 6 includes a detection circuit 60, direct-current power sources V1 and V2, and switches SW1 and SW2. The protruding portion 10 and the plane portion 11 of the lower conducting layer 41 are not illustrated in FIG. 3 for convenience of description.

One ends of the direct-current power source V1 and the switch SW1 are connected to each other, and another ends of the direct-current power source V1 and the switch SW1 are connected to a pair of electrodes 411 and 410 provided on both ends of the lower conducting layer 41 in an X-direction, respectively. On the contrary, one ends of the direct-current power source V2 and the switch SW2 are connected to each other, and another ends of the direct-current power source V2 and the switch SW2 are connected to a pair of electrodes 413 and 412 provided on both ends of the lower conducting layer 41 in a Y-direction, respectively.

The switches SW1 and SW2 are alternately on/off-controlled so that one of the switches SW1 and SW2 is in an ON state and another one is in an OFF state. Thereby, the direct-current power sources V1 and V2 alternately apply voltages between the pair of electrodes 410 and 411 in the X-direction and between the pair of electrodes 412 and 413 in the Y-direction, respectively. Here, the values of the voltages applied by the direct-current power sources V1 and V2 may be the same as each other or be different from each other.

The detection circuit 60 is connected to one end of the upper conducting layer 21. When the point P1 of the protruding portion 10 is depressed, the upper conducting layer 21 and the lower conducting layer 41 come in contact with each other, and hence voltages Vx and Vy are input to the detection circuit 60. The detection circuit 60 calculates an X-coordinate Px and a Y-coordinate Py of the depression point P1 based on the voltages Vx and Vy, respectively. The detection circuit 60 is composed of a computational circuit, such as a CPU (Central Processing Unit).

Specifically, when the switch SW1 is ON and the switch SW2 is OFF, the voltage is applied between the electrodes 410 and 411 in the X-direction. A value of a divided voltage Vx according to a contact point Q which comes in contact with the depression point P1 and sheet resistances R0 and R1 between the electrodes 410 and 411 is input to the detection circuit 60 via the depression point P1. The detection circuit 60 detects the x-coordinate Px of the depression point P1 based on the value of the divided voltage Vx.

On the contrary, when the switch SW1 is OFF and the switch SW2 is ON, the detection circuit 60 detects the y-coordinate Py of the depression point P1 based on a value of a divided voltage Vy according to sheet resistances R2 and R3 in the Y-direction, as is the case with the x-coordinate Px. Thus, the detection device 6 calculates the input position P1 (Px, Py).

Referring to FIG. 2 again, the spacers 31 are arranged between the upper conducting layer 21 and the lower conducting layer 41, and hence the input load F required for the contact of the upper conducting layer 21 and the lower conducting layer 41 is determined according to the interval d1 or d2 between the spacers 31. The interval d2 between the spacers in an area of the plane portion 11 is formed so as to be narrower than the interval d1 between the spacers in an area of the protruding portion 10. That is, since the interval d1 between the spacers in the protruding portion 10 is wider than the interval d2 between the spacers in the plane portion 11, the input load required for the contact of the upper conducting layer 21 and the lower conducting layer 41 in the protruding portion 10 is smaller than that in the plane portion 11.

Therefore, the intervals d1 and d2 between the spacers are adjusted, so that the upper conducting layer 21 and the lower conducting layer 41 come in contact with each other in the area (see position P1) of the protruding portion 10 by the given input load F (see code L1), and do not come in contact with each other in the area (see position P2) of the plane portion 11 by the given input load F (see code L2). Here, it is assumed that the given input load F is an average force which the user applies to the pointing device 1 at the time of depression, for example. Thereby, the pointing device 1 prevents detection of the input position in the plane portion 11 outside the input screen.

Since the spacers 31 are formed on the lower conducting layer 41, the spacers 31 do not mutually fix the upper conducting layer 21 and the lower conducting layer 41. Thereby, the upper film 20 in which the upper conducting layer 21 is formed can bend free to the base material 4 in which the lower conducting layer 41 is formed. Therefore, when the input load is added to the protruding portion 10, the stress which arises on the boundary B between the protruding portion 10 and the plane portion 11 is reduced, and the damage of the input screen is prevented.

Moreover, as illustrated in a code C, the boundary portion B between the protruding portion 10 and the plane portion 11 curves as viewed from the side surface of the upper film 20. According to the curve C, the stress which arises on the boundary portion B is reduced, compared with a case where the boundary portions B is a fold shape. It is desirable that the curvature radius of the curve C is R3 or more, for example.

As described above, since each of the spacers 31 is away from the upper conducting layer 21 across the interval d3, the flexure of the film 20 at the depression point P1 and its neighborhood can increase and the flexure of the film 20 at the other points can decrease. Therefore, the stress which arises on the boundary portion B is reduced by the interval d3. Unlike this, the spacers 31 may be provided so as to contact with a lower portion of the upper conducting layer 21.

Figure 6:
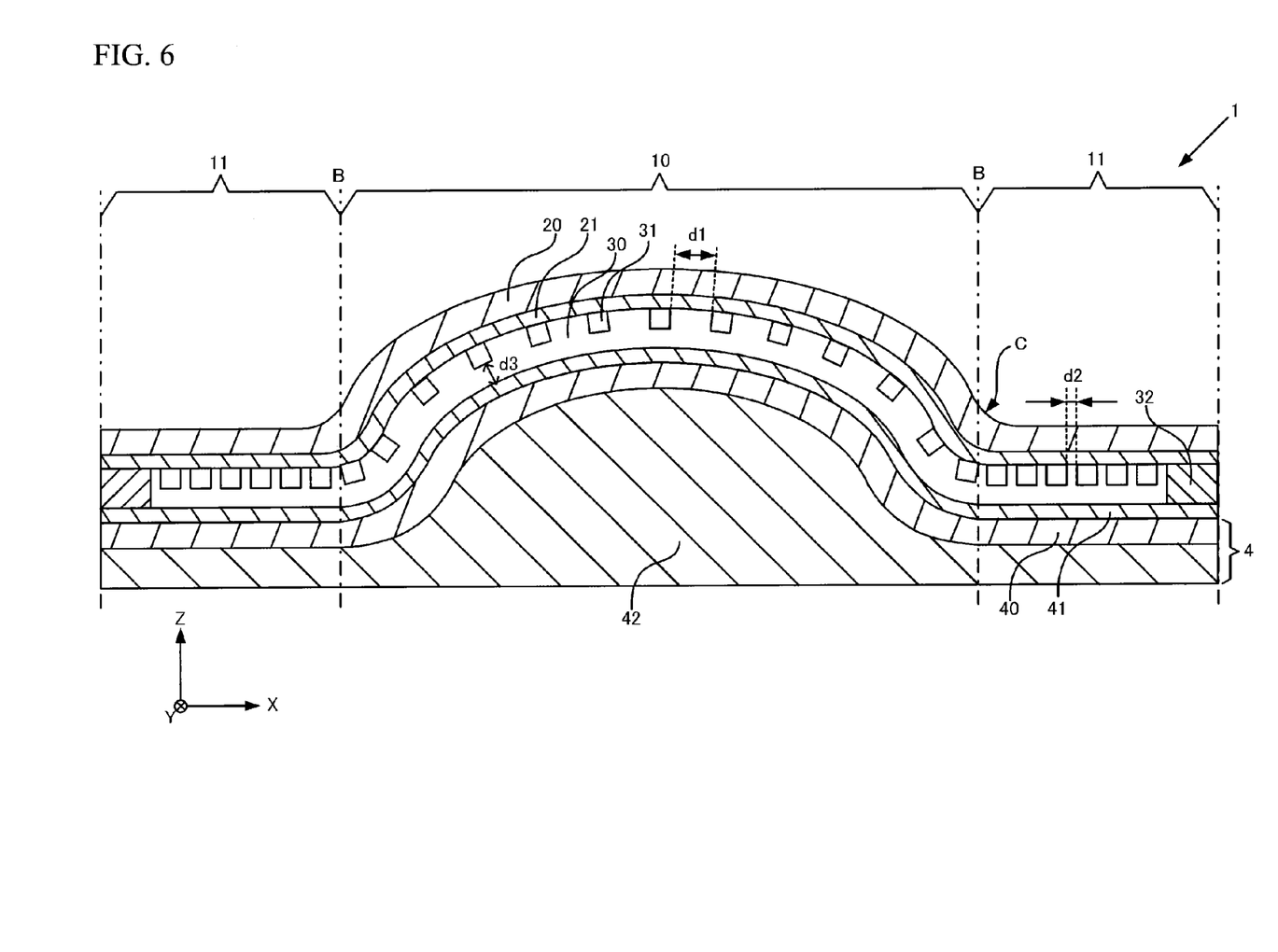
FIG. 6 is a cross sectional view of a variation example of the pointing device.

In the present embodiment, the spacers 31 are formed on the lower conducting layer 41, but the spacers 31 may be formed under the upper conducting layer 21 as substitute for this, as illustrated in FIG. 6. In the present embodiment, the lower conducting layer 41 is formed on the lower film 40, but may be formed on the substrate 42 without placing the lower film 40.

Figure 4:
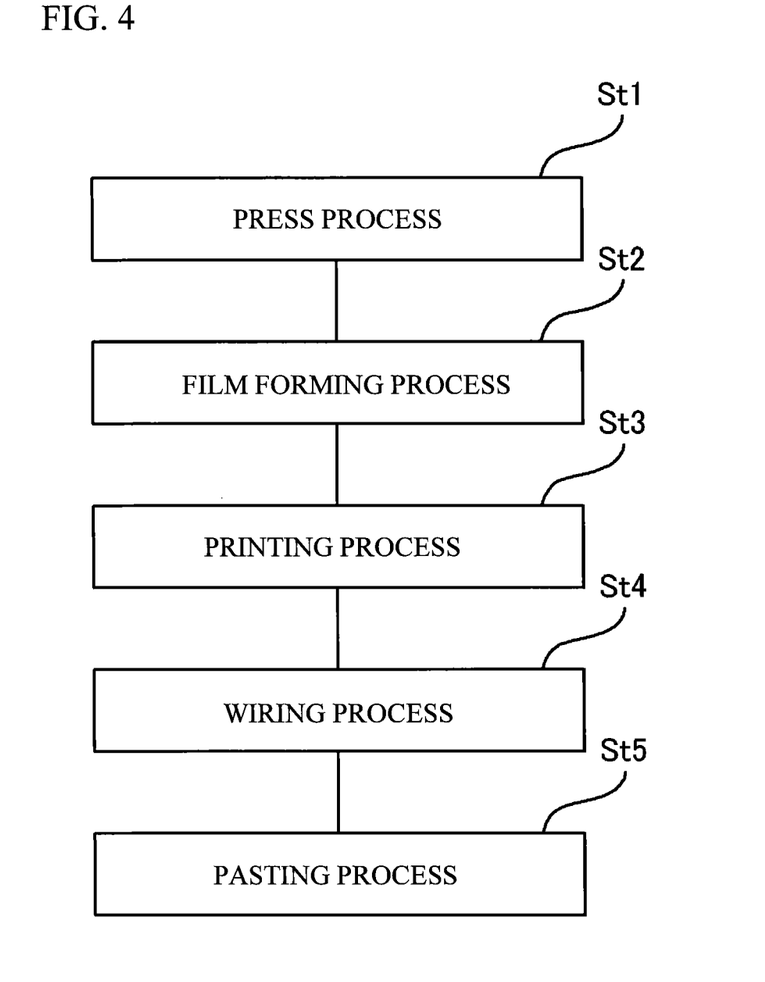
FIG. 4 is a flowchart illustrating a method for manufacturing the pointing device.

A description is given of a method for manufacturing the above-mentioned pointing device 1. As illustrated in FIG. 4, the pointing device is manufactured through a press process St1, a film forming process St2, a printing process St3, a wiring process St4, and a pasting process St5.

Figure 5:
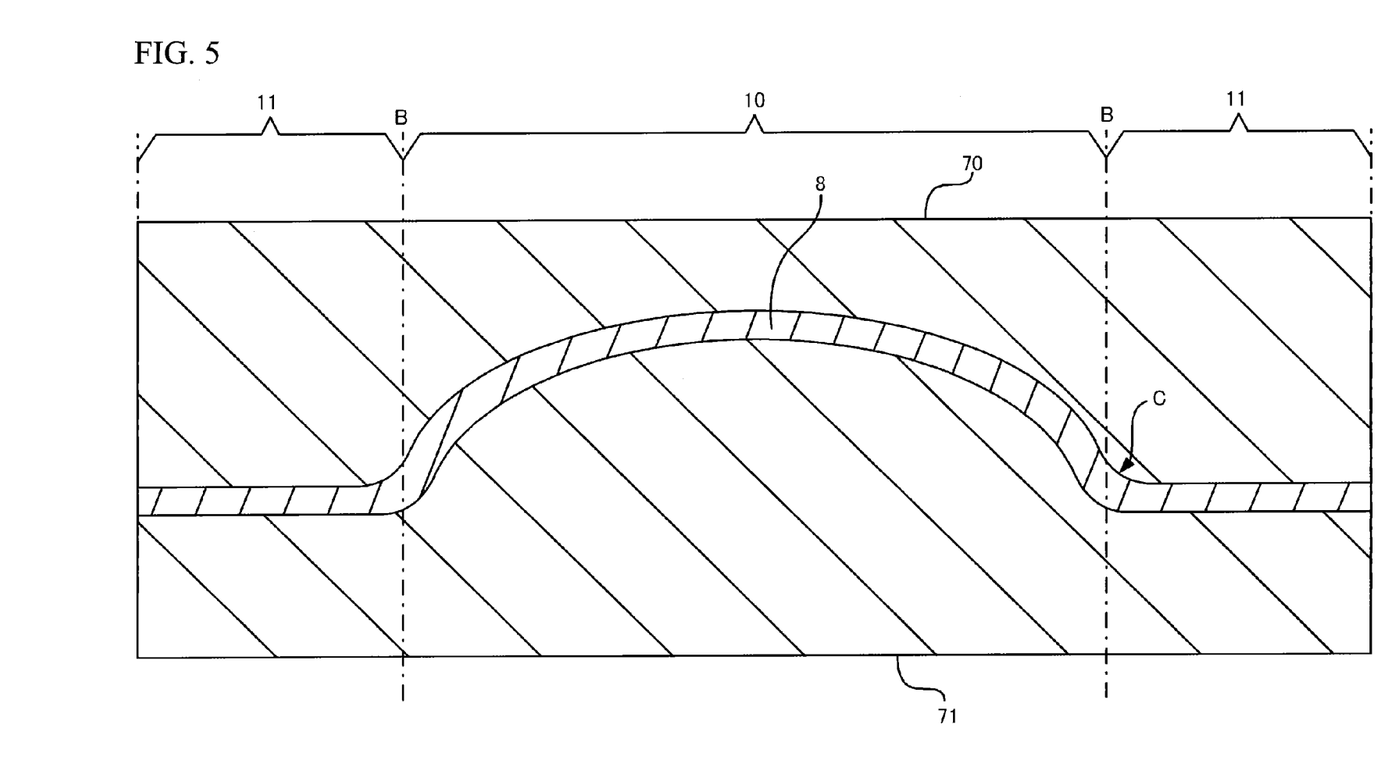
FIG. 5 is a cross sectional view illustrating a press process.

In the press process St1, a flexible film 8 with the whole flat surface is heated, and it is sandwiched between a pair of molds 70 and 71. Thereby, the protruding portion 10 that protrudes upward and the plane portion 11 that extends from the protruding portion 10 are formed on the film 8. The film 8 is Polyethylene Terephthalate (PET), for example, and becomes a transformable state when the heat of 130 degrees is given 3 seconds or more with a heating device, such as a heater. Then, after the film 8 becomes a transformable state, the film 8 is pressed by the pair of molds 70 and 71 each of which has models of the protruding portion 10 and the plane portion 11. Thereby, the upper film 20 and the lower film 40 illustrated in FIG. 2 are obtained. Here, in the press process St1, the upper film 20 and the lower film 40 may be molded by a single press.

In the press process St1, the protruding portion 10 and the plane portion 11 are formed so that the boundary portion B between the protruding portion 10 and the plane portion 11 curves, as viewed from the side surface of the pointing device 1 (see a code C). That is, the pair of molds 70 and 71 each has the curve C at the boundary portion B.

Next, in the film forming process St2, the upper conducting layer 21 is formed under the upper film 20, and the lower conducting layer 41 is formed on the lower film 40 that is the base material 4 (see FIG. 2). Each of the upper conducting layer 21 and the lower conducting layer 41 is an Indium-Tin-Oxide (ITO) film, for example, and is formed by an epitaxial growth method, a plasma CVD (Chemical Vapor Deposition) method, thin-film formation technology such as sputtering and vapor deposition, printing, plating, or any combination of them. However, a forming method of each of the upper conducting layer 21 and the lower conducting layer 41 is not limited to this. The film forming process St2 may be performed in advance of the press process St1.

Next, in the printing process St3, the insulating spacers 31 which are arranged so as to be spaced mutually by the interval d1 or d2 are formed at one of the lower portion of the upper conducting layer 21 and the upper portion of the lower conducting layer 41 (see FIG. 2). The spacers 31 are formed by, for example, acrylate resin using a method of screen printing or the like.

The interval between the spacers 31 in the area of the plane portion 11 is formed so as to become narrower than that in the area of the protruding portion 10. That is, the interval d1 between the spacers 31 in the protruding portion 10 is wider than the interval d2 between the spacers 31 in the plane portion 11, as described above.

Next, in the wiring process St4, the cable 12 illustrated in FIG. 1 is connected to the upper conducting layer 21 and the lower conducting layer 41.

Next, in the pasting process St5, the lower film 40 is pasted on the substrate 42 with an adhesive or the like. The substrate 42 is obtained by carrying out injection molding of the plastic or the like. Then, the upper film 20 is superposed on the base material 4 so that the upper conducting layer 21 is opposed to the lower conducting layer 41 across the spacers 31 (see FIG. 2). Specifically, the adhesive member 32, such as the double-stick tape, is pasted on the lower film 40 along the circumference of the lower film 40. Then, after aligning the upper film 20 with the lower film 40, the upper film 20 is put on and pasted on the lower film 40. The upper film 20 is superposed on the base material 4 so that the spacers 31 are away from another one of the lower portion of the upper conducting layer 21 and the upper portion of the lower conducting layer 41 (i.e., any one of the upper conducting layer 21 and the lower conducting layer 41 on which the spacers 31 are not formed).

According to the present embodiment, the pointing device 1 can prevent detection of the input position outside the input screen, and can prevent damage resulting from the input load. According to the manufacturing method, the above-mentioned pointing device 1 is obtained, and hence the above-mentioned effect is obtained. In the present embodiment, after the film 8 is formed by the press process St1, the conducting layers 21 and 41 are formed by the film forming process St2. However, the processes St1 and St2 are not limited to this order. That is, after the upper conducting layer 21 and the lower conducting layer 41 are formed on the flat film 8 by the film forming process St2, the flat film 8 may be molded by the press process St1 along with the conducting layers 21 and 41. Moreover, in the film forming process St2, the lower conducting layer 41 is formed under the film 8, but the lower conducting layer 41 may be formed on the substrate 42.

Although 4 wire-resistive type of touch panel is illustrated until now, the present embodiment is also applied to another-type touch panel in which the input position is detected by the contact between both conducting layers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A pointing device comprising:
   a flexible film that includes a central convex portion, a curved boundary portion that extends radially outwardly from the convex protruding portion, and a plane portion which extends radially outwardly from the boundary portion,
   wherein the central portion and the boundary portion form a protruding portion that protrudes upwardly;
   a case that receives an outer periphery of the plane portion with a remainder of the plane portion, as well as the boundary portion and the central portion, being exposed;
   a first conducting layer that is disposed under the film;
   a second conducting layer that is disposed on a base material and is opposed to and separated from the first conducting layer by a space having a first height,
   wherein the first and second conductive layers extend along the central portion, the boundary portion and the plane portion;
   an adhesive at the plane portion,
   wherein the convex portion, the boundary portion and the remainder of the plane portion are depressible into the space toward the base material; and
   a plurality of insulating adjacent dot spacers, all of which are formed on one of a lower portion of the first conducting layer or an upper portion of the second conducting layer at the convex portion, the boundary portion and the plane portion,
   wherein each of the dot spacers is separated from adjacent dot spacers by an interval,
   wherein each spacer has a second height that is less than the first height,
   wherein the interval between the adjacent dot spacers at the plane portion is narrower than an interval between the adjacent dot spacers at the protruding portion, such that the first and second conducting layers contact each other between the dot spacers at the central portion, when the protruding portion is depressed into the space toward the base portion, but do not contact each other between the dot spacers at the plane portion, when the plane portion is depressed into the space toward the base material, and
   wherein the dot spacers are opposite to and spaced from the other of the lower portion of the first conducting layer or the upper portion of the second conducting layer by a difference between the first and second heights, and
   wherein the first conducting layer at the boundary portion can move relative to the second conducting layer when depressed without contacting each other.

2. The pointing device as recited in claim 1, wherein the protruding portion has a hemispherical shape.

3. The pointing device according to claim 1, wherein the adhesive is positioned at the periphery of the plane portion, outwardly of where the dot spacers are formed.

4. A method for manufacturing a pointing device, comprising:
   forming a flexible film including a central convex portion, a curved boundary portion that extends radially outward from the convex protruding portion, and a plane portion which extends radially outward from the boundary portion on by heating the film and sandwiching the heated film between a pair of molds;
   forming the central portion and the boundary portion to be a protruding portion that protrudes upwardly;
   forming a case;
   receiving an outer periphery of the plane portion in the case but leaving exposed from the case the boundary portion and the central portion,
   wherein a remainder of the plane portion is exposed;
   forming a first conducting layer under the film;
   forming a second conducting layer on a base material and separated from the first conducting layer by a space having a first height,
   extending the first and second conducting layers along the central portion, the boundary portion and the plane portion,
   forming an adhesive at the periphery of the plane portion,
   wherein the convex portion, the boundary portion and the remainder of the plane portion are depressible into the space toward the base material;
   forming all of a plurality of insulating adjacent dot spacers on one of a lower portion of the first conducting layer or an upper portion of the second conducting layer at the convex portion, boundary portion and the plane portion,
   wherein each of the dot spacers is formed to be separate from adjacent dot spacers by a interval,
   wherein the spacers are formed with a second height that is less than the first height;
   arranging the second conducting layer to be opposed to and spaced from the first conducting layer with the dot spacers therebetween with the dot spacers being spaced from the other of the lower portion of the first conducting layer or the upper portion of the second conducting layer by a difference between the first and second heights; and
   forming the interval between the adjacent dot spacers at the plane portion that is narrower than an interval between the adjacent dot spacers at the protruding portion, such that the first and second conducting layers contact each other between the dot spacers at the central portion, when the protruding portion is depressed into the space toward the base material, but do not contact each other between the dot spacers at the plane portion, when the plane portion is depressed into the space toward the base material,
   wherein the first conducting layer is formed at the boundary portion to move relative to the second conducting layer when depressed without contacting each other.

5. The method according to claim 4, further comprising forming the adhesive at the periphery of the plane portion, outwardly of where the dot spacers are formed.

* * * * *